(No Model.)
T. CURLEY.
ANIMAL TRAP.
No. 547,539.  Patented Oct. 8, 1895.
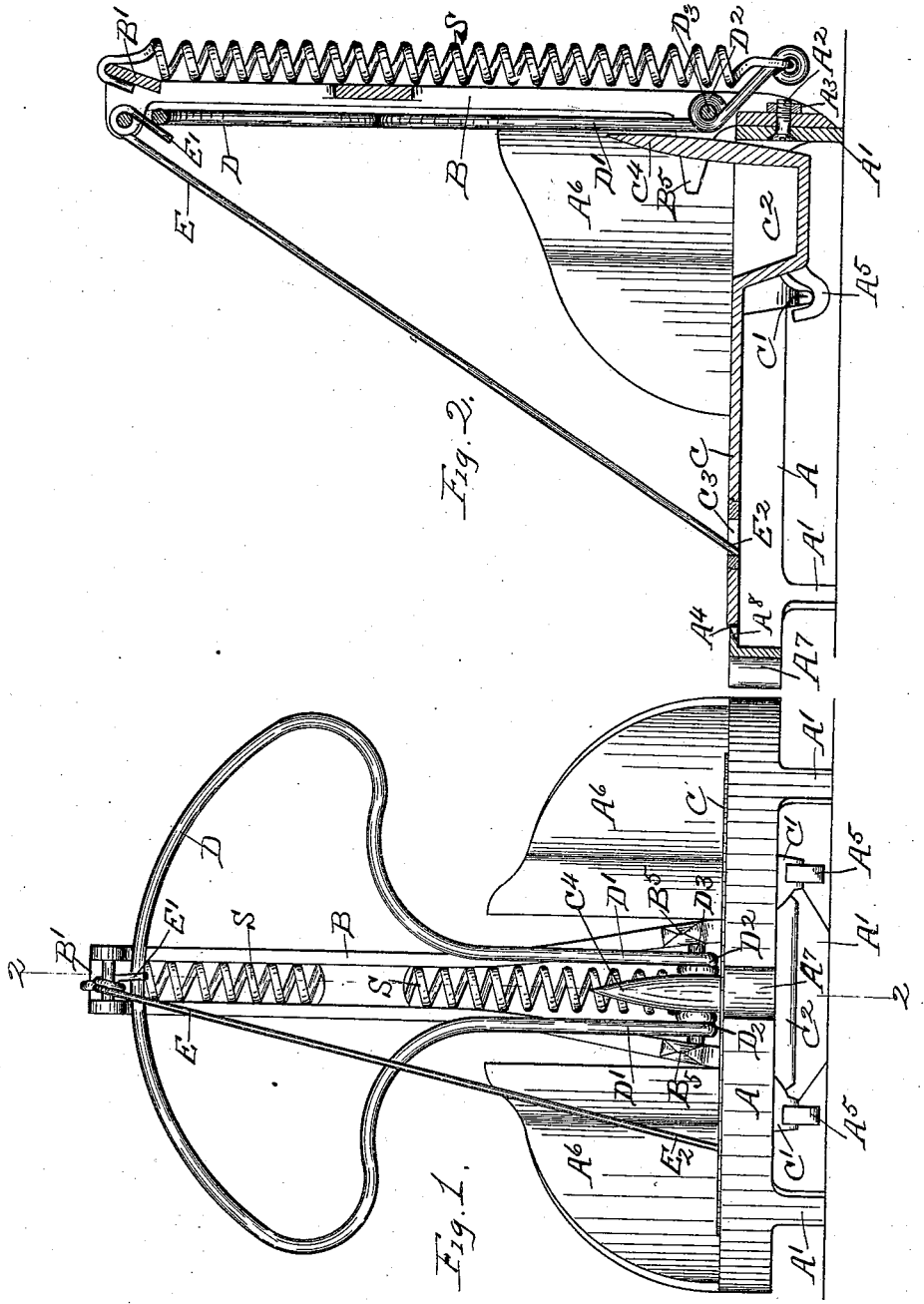
Witnesses:
Frank R. Kendall.
Geo. H. Curtis
Inventor:
Thomas Curley
by Mosher Curtis
Attys.

UNITED STATES PATENT OFFICE.

THOMAS CURLEY, OF TROY, NEW YORK.

ANIMAL-TRAP.

SPECIFICATION forming part of Letters Patent No. 547,539, dated October 8, 1895.

Application filed December 26, 1894. Serial No. 532,946. (No model.)

*To all whom it may concern:*

Be it known that I, THOMAS CURLEY, a citizen of the United States, residing at Troy, county of Rensselaer, and State of New York, have invented certain new and useful Improvements in Animal-Traps, of which the following is a specification.

The invention relates to such improvements; and it consists of the novel construction and combination of parts hereinafter described and subsequently claimed.

Reference may be had to the accompanying drawings and the letters of reference marked thereon, which form a part of this specification.

Similar letters refer to similar parts in both figures therein.

Figure 1 of the drawings is a front elevation of my improved trap. Fig. 2 is a central vertical section of the same, taken on the broken line 2 2 in Fig. 1.

A is a supporting-base having legs $A'$, and B is an upright erected from the rear portion of the base. The base and upright are composed of separate castings secured together by the screw-bolt $A^2$ and nut $A^3$. The base is in the form of a narrow shell inclosing a central aperture $A^4$, and within the central aperture is located a movable platform C. The platform is pivotally mounted upon the base by means of the lugs $C'$, depending from the platform and supported in bearings in the brackets $A^5$, integral with the base. The rear end of the platform is provided with a bait-receptacle $C^2$, and the base-casting has integral guard-wings $A^6$ on either side of the upright and with such upright forming a shield or guard to prevent access to the bait-receptacle from the rear.

D is a deadfall comprising an integral piece of wire bent at its middle portion to correspond in form with the general form of the periphery of the base and having its ends extended to form parallel arms $D'$ and eyes $D^2$, through which is inserted the pivot $D^3$, supported at opposite ends in the lower part of the upright casting. The extremities of the wire extend rearwardly of the upright near its lower end and are connected by a coil-spring S with the upper end of the upright, the upper end of the coil being hooked over the cross-bar $B'$ of the upright. The deadfall tends to assume, under the influence of the spring, a horizontal position, resting at the front end upon the base-casting.

In setting the trap for use the deadfall is raised against the resilient force of the spring to a vertical position, as shown in the drawings, and retained in such position by means of the trigger E, comprising an integral piece of wire coiled near one end around the pivot $B^2$, supported by the upper end of the upright, and having its shorter end $E'$ in controlling engagement with the deadfall and its longer arm $E^2$ inserted in an aperture $C^3$ in the movable platform in controlled engagement with the wall of such aperture. The bait-receptacle being guarded at the rear by the wings $A^6$ and upright B, an animal in attempting to gain access to the bait must enter the trap from the front, crossing the shell of the base-casting in the path of the deadfall. The bait-receptacle, being at the rear of the movable platform, can only be reached by crossing the platform, which will be depressed by the animal's weight, and thereby cause the longer arm of the trigger to be released from engagement therewith and releasing the deadfall to the influence of its operating-spring. The spring has sufficient force to cause the death or serious injury of an animal whose body is interposed between the base-casting and the descending deadfall.

To insure the coincidence of the deadfall with the similarly-formed shell of the base-casting, I provide a centering device comprising a tapered post $C^4$, projecting upwardly from the rear end of the platform and adapted to enter the space between the parallel arms $D'$ of the deadfall and limit the lateral movement of the deadfall in its descent by engagement with such arms. The upright B may also be provided with a pair of forwardly-projecting lugs $B^5$ on opposite sides of such arms $D'$ to further guide the deadfall in its descent. A finger-recess $A^7$ in the front edge of the base permits the operator to insert his finger beneath the deadfall to raise the same in setting the trap.

The kind of bait and force of the operating-spring may be varied to adapt the trap for the capture of various animals.

I have shown the shell of the base-casting undercut at $A^8$ along its inner edge, forming a sharp edge on such shell, which engages and prevents the withdrawal of an object forced by the deadfall against the shell.

What I claim as new, and desire to secure by Letters Patent, is—

1. In an animal-trap, the combination with a supporting base, and an upright erected from the rear of the base, of a movable platform, a bait-receptacle in rear of the platform, a deadfall pivoted at the foot of the upright, a projection on the deadfall extending rearwardly of its pivot, a coil-spring connected at its lower end with the deadfall-projection, and at its upper end under tension with the upper end of the upright, and a trigger pivoted upon the upper end of the upright and engageable with the deadfall and movable platform, substantially as described.

2. In an animal trap, the combination with a base; and a platform movably mounted upon the base; of the deadfall formed of a single piece of wire bent at its middle portion to correspond with the form of the base and having the adjacent approximately parallel arms D'; the tapered guide-post $C^4$ midway between the vibratory paths of the arms D'; a spring for operating the deadfall; and a trigger for connecting the deadfall with the movable platform, substantially as described.

3. In an animal-trap, the combination with an apertured base having the wall of the aperture sharply undercut to form thereon a sharp edge; of a platform mounted upon the base and movable in the aperture, a pivoted spring-actuated dead-fall movable to and from the base, and a trigger connection between the movable platform and deadfall, substantially as described.

In testimony whereof I have hereunto set my hand this 4th day of December, 1894.

THOMAS CURLEY.

Witnesses:
FRANK C. CURTIS,
M. A. TIERNEY.